(12) United States Patent
Kocher et al.

(10) Patent No.: US 6,312,119 B1
(45) Date of Patent: Nov. 6, 2001

(54) METHOD AND APPARATUS FOR FOAM REMOVAL IN AN INK CONTAINER

(75) Inventors: Thomas E. Kocher, Rochester, NY (US); Omid Moghadam, Fairfax, VA (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/606,756

(22) Filed: Jun. 29, 2000

(51) Int. Cl.[7] .............................................. B41J 2/19
(52) U.S. Cl. ................................................... 347/92
(58) Field of Search ................................. 347/84, 85, 92

(56) References Cited

U.S. PATENT DOCUMENTS

| | | | |
|---|---|---|---|
| 3,889,269 | 6/1975 | Meyer et al. | 347/100 |
| 4,600,928 | 7/1986 | Braun et al. | 347/27 |
| 4,849,769 | 7/1989 | Dressler | 347/27 |
| 5,583,544 | * 12/1996 | Stamer et al. | 347/7 |
| 5,709,253 | 1/1998 | Maerzke | 141/18 |
| 5,751,320 | 5/1998 | Scheffelin et al. | 347/85 |
| 6,234,621 | * 5/2001 | Musser et al. | 347/92 |

* cited by examiner

*Primary Examiner*—N. Le
*Assistant Examiner*—Michael P. Nghiem
(74) *Attorney, Agent, or Firm*—Walter S. Stevens

(57) ABSTRACT

An apparatus for removing foam from an ink container of a printer including a nozzle disposed within the ink container such that the nozzle floats upon a surface of the ink located within the container. The nozzle contains a plurality of inlet channels located therein and an outlet communicating with the inlet channels. A vacuum source is coupled with the outlet of the nozzle to create a suction force within the inlet channels of the nozzle to remove foam located on the surface of the ink. As the level of the ink is depleted or added to the container, the nozzle remains on the surface of the ink and the foam is actively removed from the surface through the inlet channels.

8 Claims, 3 Drawing Sheets

Fig. 5
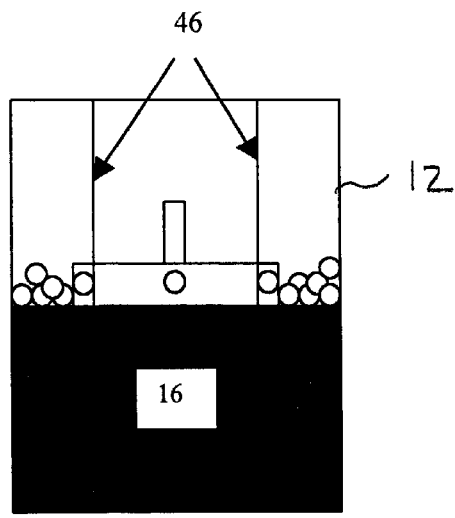
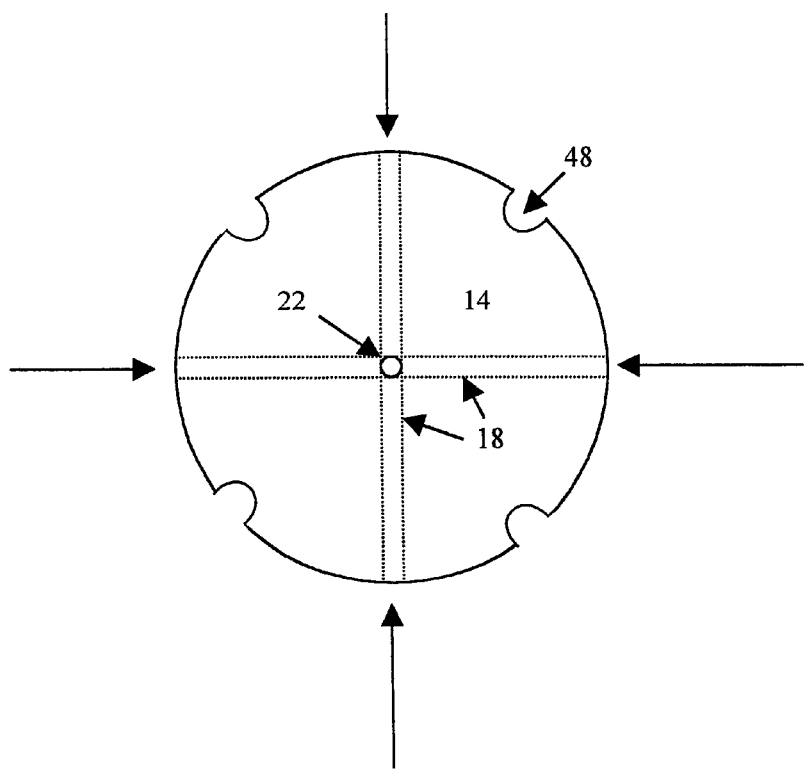
Figure 6

METHOD AND APPARATUS FOR FOAM REMOVAL IN AN INK CONTAINER

FIELD OF THE INVENTION

The present invention relates to a method and apparatus for removing foam from a container, and more particularly, a vacuum apparatus and method for removing foam from an ink container.

BACKGROUND OF THE INVENTION

Ink formulations, under the right conditions, ingest air and produce foam. These conditions include an air/ink interface where, for example, agitation produces foam. This air/ink interface can occur in storage bottles, as well as the printhead. Agitation can occur during shipment of the ink bottles or containers, and more likely, through the removal of the ink containers from the printer during service of the printer, when the ink types are changed, or during general movement of the printer.

In an inkjet printer, a robust ink delivery system is critical. Thus, the presence of foam can be a major problem, since it can eventually block the ink flow. Moreover, displacing foam from capillaries, such as ink delivery tubes, ink reservoirs and printheads can be extremely difficult.

In large format and high volume inkjet printers, it is desirable to use large volumes of ink, for example, greater than 1 liter/color resident in the printer. This typically requires one or more storage containers in addition to a complex delivery and pumping system to move the ink from the user-accessible ink bottles to the printhead. With such printers it is imperative that no foam is introduced into the delivery system.

One manner of reducing the production of foam is to reduce the air/ink interface within the container. This can be accomplished by filling the ink bottles to the maximum capacity. However, this only solves the problem in new ink containers. Once the containers are installed and the ink is consumed, the volume originally occupied by the ink is replaced with air, as the bottle must be open to the atmosphere for the ink delivery system to work properly.

Thus, it is desirable to reduce the amount of foam present in an ink container of a printer.

SUMMARY OF THE INVENTION

An object of the present invention is to provide an apparatus and method for reducing the amount of foam within an ink container.

Another object of the present invention is to provide an apparatus which removes any foam which occurs in the container by vacuuming the foam from the container.

Still another aspect of the present invention is to provide a vacuum apparatus which maintains contact with the air/ink interface as the amount of ink within the container is changed.

According to presently preferred embodiments of the present invention, an apparatus for removing foam from an ink container of a printer includes a nozzle disposed within the ink container, wherein the nozzle floats upon a surface of the ink located within the container. A plurality of inlet channels are located within the nozzle and an outlet communicates with the inlet channels of the nozzle. A vacuum source communicates with the outlet of the nozzle for creating a suction force within the inlet channels of the nozzle to remove foam located on the surface of the ink.

DETAILED DESCRIPTION OF THE INVENTION

Other features and advantages of the present invention will become apparent from the following description of preferred embodiments of the invention, which refers tot e accompanying drawings, wherein:

FIGS. 5 and 6 illustrate a third embodiment of the present invention.

DETAILED DESCRIPTION OF THE INVENTION

Figure 1:
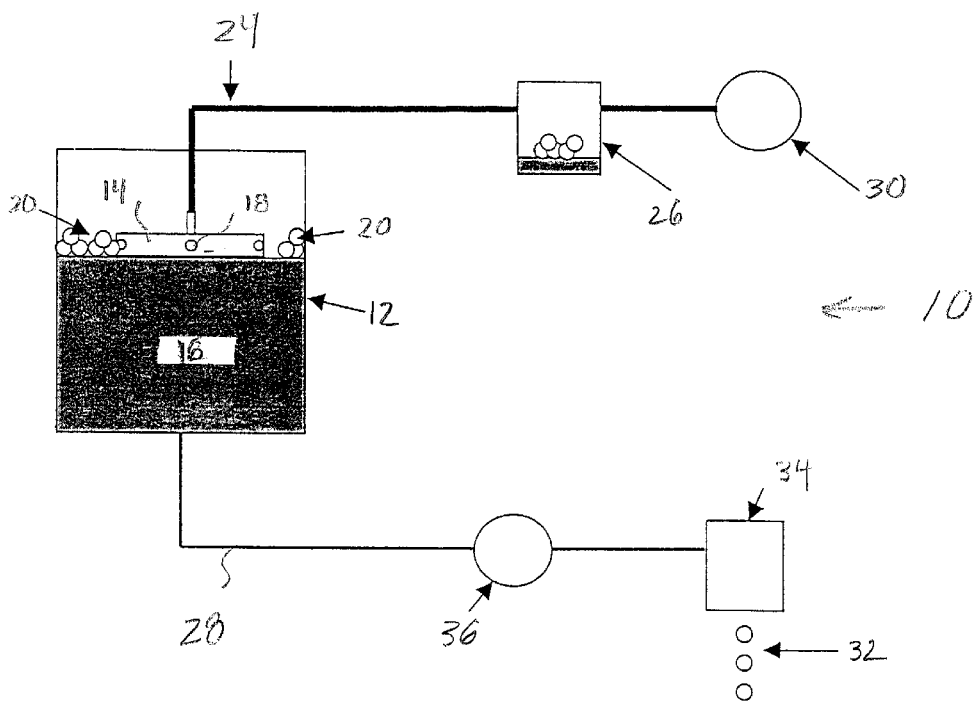
FIG. 1 is a perspective view of a vacuum apparatus according to a first embodiment of the present invention.

Referring to FIG. 1, the vacuum apparatus 10 of the present invention actively removes any foam generated within an ink container 12. Although the present invention is described in relation to an ink container of a printer, it should be appreciated that other environments of use or contemplated by the present invention.

Located within ink container 12 is a vacuum nozzle 14. Nozzle 14 floats on the surface of ink 16 and thus dynamically moves up and down within container 12 as the ink is depleted or added. Nozzle 12 can be made of any moldable, low-density material such as plastic or Styrofoam, such that inlet channels 18 could be formed therein.

Figure 2:
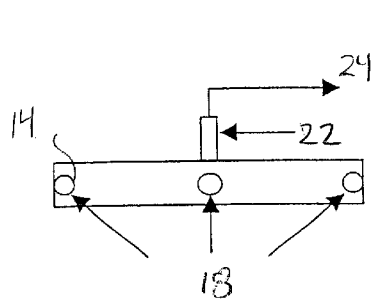
FIG. 2 is an enlarged, cross-sectional view of the vacuum nozzle of the apparatus of FIG. 1.
Figure 3:
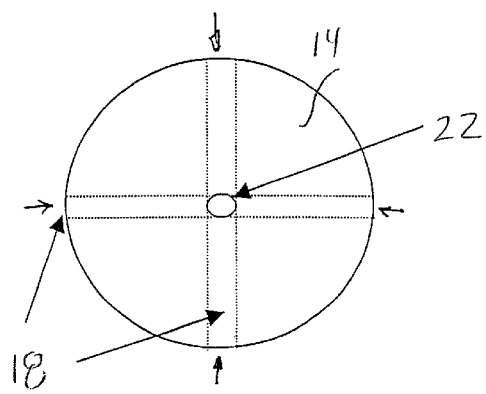
FIG. 3 is a top view of the nozzle of FIG. 2.

Foam 20 is removed from the ink surface through inlet channels 18. As shown in FIGS. 1–3, nozzle 14 is plate-shaped having a plurality of inlets 18 which communicate with a centralized outlet coupling 22. It should be appreciated that nozzle 14 can have a variety of shapes, for example, the nozzle can be round, square or rectangular in shape. Also, the number of inlets can be varied. However, as shown in FIG. 2, the inlet channels are contained entirely within nozzle 14 and the inlet openings are positioned so as to not touch the fluid surface.

Coupled to coupling 22 is a vacuum line 24. Line 24 connects nozzle 14 to a vacuum source 30. Communicating with line 24 is a waste trap 26 into which the foam that is removed from container 12 is deposited. Line 24, as well as, nozzle 14 need to remain above the liquid surface, so as to not erroneously remove any ink, but only the foam 20. In order to not interfere with the movement of nozzle 14, line 24 can be made of a flexible tubing, such as Tygon® flexible plastic tubing from Saint-Gobain Performance Plastics Corporation of Wayne, N.J.

In operation, as ink droplets 32 exit printhead 34 ink 16 is drawn from the container 12 via ink delivery pump 36 and line 28. As the level of the ink is depleted nozzle 14 remains on the surface of the ink and foam 20 is actively removed from the surface through inlets 18 and vacuum 30.

Figure 4:
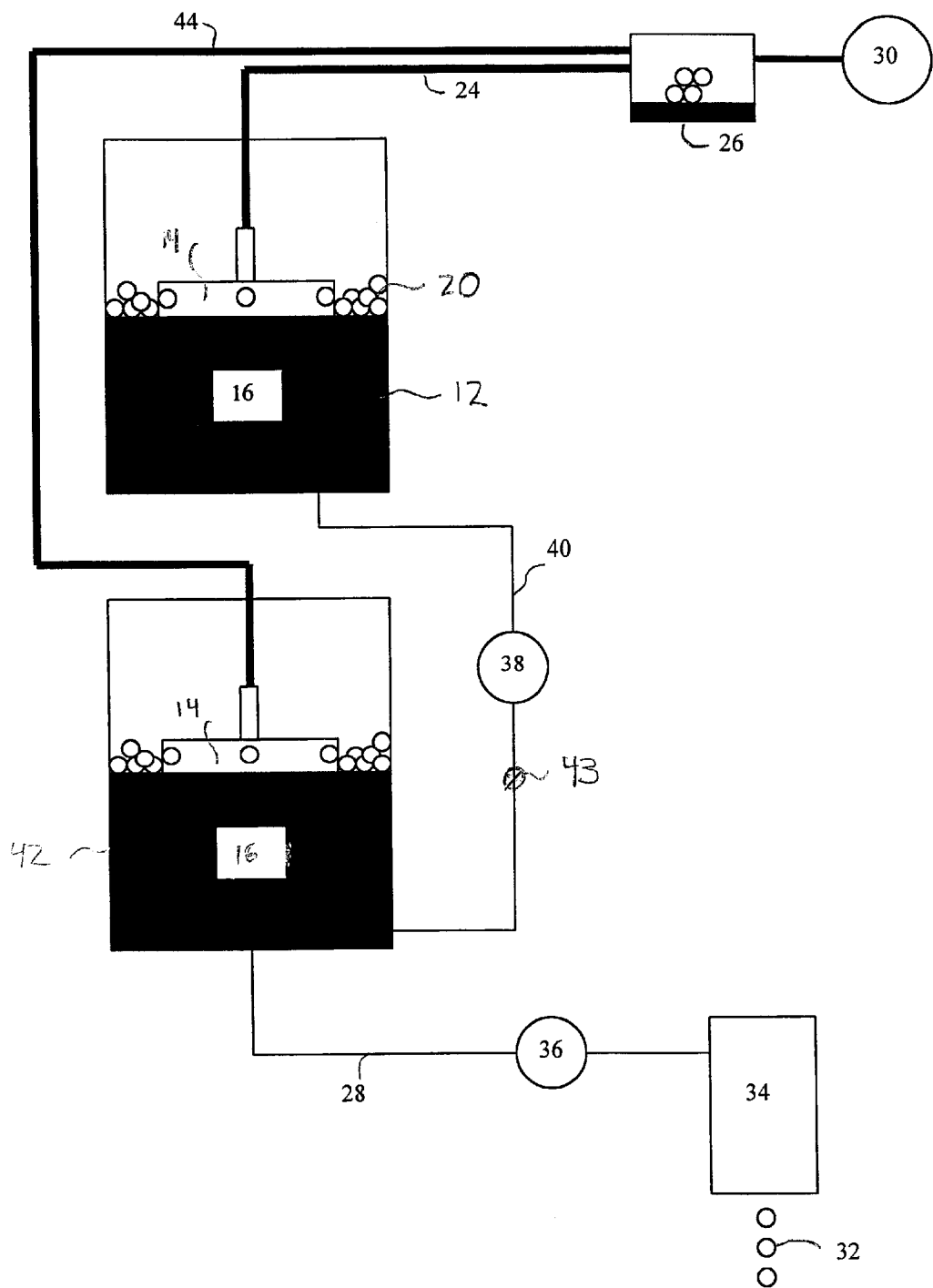
FIG. 4 is a perspective view of the vacuum apparatus according to a second embodiment of the present invention.

In typical large format ink jet printers a plurality of ink containers are present. FIG. 4 illustrates another embodiment of the present invention, wherein a second ink container 42 is provided. Although only two ink containers are shown, it should be appreciated that a plurality of foam removal devices can be provided based upon the number of ink containers present in the printer.

Container 42, like container 12, includes a vacuum nozzle 14 and ink 16. Nozzle 14 communicates with vacuum source 30 and trap 26 via a second vacuum line 44. In this embodiment an ink delivery line 40 exits container 12 at the bottom thereof and enters container 42 below the ink level, i.e., also at the bottom of tank 42. Thus, the transfer of foam between the containers is prevented. An ink delivery pump 38 communicates with line 40 to deliver ink between the two containers. A one-way valve 43 is also located in line 40 to prevent ink from flowing from container 42 into container 12.

FIGS. 5 and 6 illustrate a third embodiment of the present invention. As shown in FIG. 5, container 12 can include a plurality of rails 46 anchored within the container. Referring to FIG. 6, nozzle 14 includes a plurality of indentations 48 along a height thereof, which mate with guide rails 46 to guide the vertical movement of nozzle 14 within the container. Utilizing a plurality of guide rails ensures that nozzle 14 remains constrained to this vertical movement.

While the foregoing description includes many details and specificities, it is to be understood that these have been included for purposes of explanation only, and are not to be interpreted as limitations of the present invention. Many modifications to the embodiments described above can be made without departing from the spirit and scope of the invention, as is intended to be encompassed by the following claims and their legal equivalents.

PARTS LIST

10. Vacuum apparatus
12. Ink container
14. Nozzle
16. Ink
18. Inlet channels
20. Foam
22. Outlet coupling
24. Line-vacuum
26. Wastetrap
28. Line-ink Deliver
30. Vacuum source
32. Droplets
34. Printhead
36. Pump
38. Ink delivery pump
40. Ink delivery line
42. Container
44. Vacuum line
45. One Way Valve
46. Rails
48. Indentations

What is claimed is:

1. An apparatus for removing foam from at least one ink container of a printer comprising:

a nozzle disposed within the at least one ink container, wherein the nozzle floats upon a surface of the ink located within the container;

a plurality of inlet channels located within the nozzle;

an outlet communicating with the inlet channels of the nozzle;

a vacuum source communicating with the outlet of the nozzle for creating a suction force within the inlet channels of the nozzle to remove foam located on the surface of the ink.

2. The apparatus of claim 1, wherein the inlet channels are positioned within the nozzle so as to be located above the surface of the ink.

3. The apparatus of claim 1, wherein the nozzle is circular in shape and the inlet channels extend across a length thereof.

4. The apparatus of claim 1, further comprising a vacuum line connected between the vacuum source and the outlet of the nozzle, wherein the vacuum line is flexible to move with the nozzle as the ink is added or depleted from the container.

5. The apparatus of claim 4, further comprising a waste trap in communication with the line to trap the foam removed from the ink container.

6. The apparatus of claim 1, further comprising a plurality of guide rails located within the ink container, wherein the nozzle is guided by the rails during vertical movement within the container.

7. The apparatus of claim 1, further comprising at least two ink containers and an ink delivery line disposed between the two ink containers.

8. A method of removing foam from an ink container comprising the steps of:

positioning a vacuum nozzle within the ink container such that the nozzle floats upon a top surface of the ink;

connecting the nozzle to a remote vacuum source;

vacuuming the foam located on the top surface of the ink via the nozzle; and moving the nozzle within the container as the ink is added to or depleted from the container such that the nozzle always remains on the surface of the ink.

* * * * *